(12) United States Patent
Bittner et al.

(10) Patent No.: US 11,766,036 B2
(45) Date of Patent: Sep. 26, 2023

(54) AGRICULTURAL VEHICLE HAVING AN IMPROVED APPLICATION BOOM FOR SUPPORTING AN APPLICATION SYSTEM

(71) Applicant: CNH Industrial America LLC, New Holland, PA (US)

(72) Inventors: Roy A. Bittner, Cato, WI (US); Steven Winkel, Kiel, WI (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 158 days.

(21) Appl. No.: 16/546,914

(22) Filed: Aug. 21, 2019

(65) Prior Publication Data
US 2021/0051938 A1 Feb. 25, 2021

(51) Int. Cl.
*A01M 7/00* (2006.01)
*B05B 1/20* (2006.01)

(52) U.S. Cl.
CPC .......... *A01M 7/0071* (2013.01); *A01M 7/006* (2013.01); *A01M 7/0053* (2013.01); *B05B 1/20* (2013.01)

(58) Field of Classification Search
CPC ............... A01M 7/0071; A01M 7/006; A01M 7/0053; A01M 7/0075; B05B 1/20
USPC ........................................................ 239/159
See application file for complete search history.

(56) References Cited

U.S. PATENT DOCUMENTS

| 2,301,213 | A | | 11/1942 | Kang | |
|---|---|---|---|---|---|
| 3,552,652 | A | * | 1/1971 | Greenwood | ............ B05B 3/105 239/77 |
| 5,098,018 | A | * | 3/1992 | Hadar | ................. A01M 7/0014 180/89.13 |
| 6,244,520 | B1 | * | 6/2001 | Patchett | ................ A01M 7/006 239/114 |

(Continued)

FOREIGN PATENT DOCUMENTS

| CN | 105514887 B | 1/2018 |
|---|---|---|
| EP | 1468605 B1 | 4/2003 |

OTHER PUBLICATIONS

Wiley, 8 Advantages of Using Aluminum Extrusion for Your Next Design, Feb. 27, 2017, Wiley Metal, 4 Pages (Year: 2017).*

(Continued)

*Primary Examiner* — Tuongminh N Pham
*Assistant Examiner* — Kevin Edward Schwartz
(74) *Attorney, Agent, or Firm* — Rebecca Henkel; Rickard Demille (57) ABSTRACT

An agricultural vehicle having a chassis and an application boom coupled to the chassis. The agricultural vehicle is configured to deliver agricultural product to an agricultural field. The application boom has a boom arm. The boom arm includes a longitudinal truss member, and a longitudinal chase supported by the longitudinal truss member. The longitudinal chase includes a channel. The agricultural vehicle further includes an application system. The application system has a product tank supported by the chassis and storing a volume of the agricultural product for delivery onto (Continued)

an agricultural field, a plurality of nozzle bodies, a piping system delivering the agricultural product to the plurality of nozzle bodies, and one or more control lines coupled to the plurality of nozzle bodies and for controlling the plurality of nozzle bodies. The one or more control lines are supported by the channel.

18 Claims, 7 Drawing Sheets

(56) References Cited

U.S. PATENT DOCUMENTS

| | | | |
|---|---|---|---|
| 7,066,402 B2 | 6/2006 | Goebel et al. | |
| 7,669,784 B2 | 3/2010 | Sobolik et al. | |
| 7,878,464 B2 | 2/2011 | Oh | |
| 8,573,510 B2 | 11/2013 | Bisson et al. | |
| 8,882,053 B2 | 11/2014 | Chirpich et al. | |
| 8,894,022 B2 | 11/2014 | Chirpich et al. | |
| 2015/0366127 A1 | 12/2015 | Roberge et al. | |
| 2016/0262371 A1* | 9/2016 | Hiddema | A01M 7/0067 |
| 2017/0216871 A1 | 8/2017 | Klemp, Jr. et al. | |
| 2017/0303462 A1 | 10/2017 | Ribotta et al. | |
| 2019/0098846 A1* | 4/2019 | Murphy | B32B 1/08 |
| 2019/0265426 A1* | 8/2019 | Zhejian | G02B 6/4455 |
| 2019/0357519 A1* | 11/2019 | Castro | A01C 23/008 |

OTHER PUBLICATIONS

Millennium Boom Features; Specialty Enterprises; https://specialtyllc.net/Millennium/—(5) pages.

Millennium Aluminum Spray; Specialty Enterprises; Superior Performance Through Superior Design; https://specialtyllc.net/Millennium/—(2) pages.

* cited by examiner

AGRICULTURAL VEHICLE HAVING AN IMPROVED APPLICATION BOOM FOR SUPPORTING AN APPLICATION SYSTEM

FIELD OF THE INVENTION

The invention relates generally to agricultural machines having agricultural product application equipment and, in particular, to an agricultural vehicle including an improved application boom for supporting an application system.

BACKGROUND OF THE INVENTION

Various types of agricultural vehicles sprayers, floaters, applicators, collectively referred to herein as applicators) are employed to deliver fertilizer, pesticides, herbicides, or other products to the surface of a field. Such agricultural vehicles typically include an application boom configured to facilitate product delivery over wide swaths of soil.

Hoses and harnesses are commonly attached rather haphazardly to application booms using cable ties and an occasional clamp. While expedient, the arrangement is often untidy, unruly, and unprofessional looking. The arrangement is also often hard to clean, difficult to service, and often causes chafing and subsequent failure of the hose(s) and/or harness(es), Moreover, modern sprayers are increasingly controlling the spray pattern on an individual nozzle basis, thereby increasing the amount of control lines to each nozzle, expanding the issue.

SUMMARY OF THE INVENTION

According to aspects of the invention, an agricultural vehicle includes a hose and wire chase integral to an application boom. The hose and wire chase includes a chamber for containing the hose or wiring associated with delivering power and control to the structure of nozzle bodies. The chase is parallel with a truss length of the application boom, with ports to allow wire and hose access to each nozzle.

According to one aspect of the invention, an agricultural vehicle includes a chassis and an application boom coupled to the chassis, The agricultural vehicle is configured to deliver agricultural product to an agricultural field. The application boom has a boom arm. The boom arm includes a longitudinal truss member, and a longitudinal chase supported by the longitudinal truss member. The longitudinal chase includes a channel and a cover for the channel. The agricultural vehicle further includes an application system. The application system has a product tank supported by the chassis and storing a volume of the agricultural product for delivery onto an agricultural field, a plurality of nozzle bodies, a piping system delivering the agricultural product to the plurality of nozzle bodies, and one or more control lines coupled to the plurality of nozzle bodies and for controlling the plurality of nozzle bodies. The one or more control lines are supported by the channel.

According to another aspect of the invention, an agricultural vehicle includes a chassis, wheels supporting the chassis for moving the vehicle, and an application boom coupled to the chassis and configured to deliver agricultural product to an agricultural field, The application boom includes a first boom arm and a second boom arm. Each of the first boom arm and second boom arm includes, respectively, a longitudinal composite tube having a first length, a non-composite chase having a second length substantially similar to the first length, and an application system. The non-composite chase includes a channel and a mounting structure. The application system includes a product tank supported by the chassis and storing a volume of the agricultural product for delivery onto an agricultural field, and a plurality of nozzle bodies. Each of the plurality of nozzle bodies is coupled to one of the mounting structures and has a product dispensing nozzle. The application system further includes a piping system delivering the agricultural product to the plurality of nozzle bodies, and one or more control lines coupled to the plurality of nozzle bodies and for controlling the plurality of nozzle bodies. The one or more control lines supports the channel.

According to yet another aspect of the invention, an application boom for an agricultural vehicle includes a longitudinal composite tube having a first length, and a non-composite chase having a second length substantially similar to the first length and being supported by the longitudinal composite tube. The non-composite chase includes a channel for supporting one or more control lines, a first mounting structure for supporting a plurality of nozzle bodies coupled to the one or more control lines, a second mounting structure, and a cap mounted to the second mounting structure. The cap includes a plurality of ports for a plurality of branches of the one or more control lines to exit from the channel and couple to the plurality of nozzle bodies.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may he made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Referring now to the drawings and specifically to FIGS. 1-4, aspects of the invention are shown for use with an agricultural vehicle, which is shown in the figures to be an agricultural sprayer vehicle (referred to herein as simply a "sprayer") 10. The sprayer 10 is shown as a front-boom sprayer, such as those available from CNH Industrial, including the Miller Nitro sprayers and New Holland Guardian Series sprayers. Other arrangements for the sprayer 10 are contemplated, including a rear-mounted configuration boom sprayer, such as those available from CNH Industrial, including the Miller Condor Series sprayers and New Holland Guardian Series rear-boom sprayers, Moreover, other agriculture machines and vehicles incorporating aspects of the invention are contemplated, including agriculture vehicles having a boom.

The sprayer 10 includes a frame or chassis 15 having front and back ends 20 and 25, respectively. The chassis 15 provides structural support for various assemblies, systems, and components of the sprayer 10. These various assemblies, systems, and components can include an operator cab 35 in a forward position toward the front end 20 of the chassis 15. An engine 40 and a hydraulic system 45 are shown in a rearward position toward the back end 25 of the chassis 15. The hydraulic system 45 receives power from the engine 40 and includes at least one hydraulic pump which can be in a hydrostat arrangement. The hydraulic pump(s) provide hydraulic pressure for operating hydraulic components within the hydraulic system 45. For sprayers with hydrostatic drives, hydraulic motors are operably connected to the hydraulic pump(s) for rotating wheels 50 of the sprayer 10. In mechanical drive applications, a mechanical transmission receives power from the engine 40 and delivers power for rotating the wheels 50 by way of power-transmitting driveline components. Example power-transmitting driveline components include drive shafts, differentials, and other gear sets in portal, drop boxes, or other housings.

Figure 5:
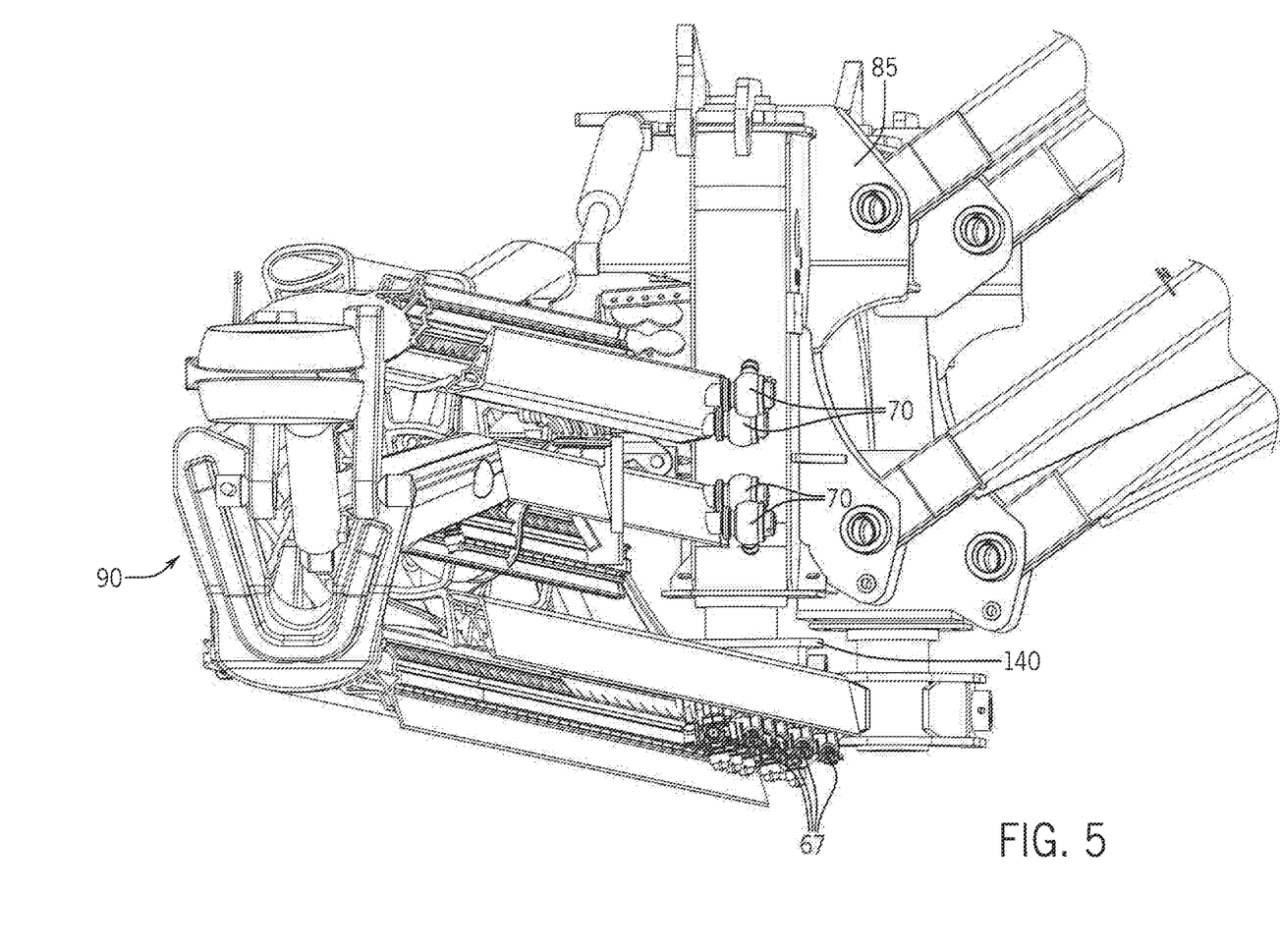
FIG. 5 is an enlarged isometric view of a portion of the left boom arm of FIG. 4 according to some aspects of the present invention.

A spray-application system 55 is supported by the chassis 15. The spray-application system 55 includes storage containers, such as a rinse tank 60 for storing water or a rinsing solution and a product tank 65 for storing a volume of product for delivery onto an agricultural field with the sprayer 10. The product includes any of a variety of agricultural liquid products, such as various pesticides, herbicides, fungicides, liquid fertilizers, and other liquids including liquid suspensions beneficial for application onto agricultural fields. A product delivery pump can convey product from the product tank 65 through plumbing components to nozzle bodies 67 (FIG. 5). The plumbing components includes a piping system 70 (FIG. 5) for transport of the product. The nozzle bodies 67 are spaced from each other along the width of an application boom (simply referred to as boom 75 herein) during spraying operations of the sprayer 10. To simplify the figures, only a small number of the nozzle bodies 67 are shown and not all of the piping system 70 is shown. One skilled in the art will know to extrapolate and expand the number of nozzle bodies and piping system as necessary, Groups or banks of multiple adjacent nozzle bodies define multiple spray segments of the spray system. Spray segments are defined along the boom 75 and selectively deliver product for release onto an agricultural field at locations corresponding to positions of activated spray segments.

Figure 1:
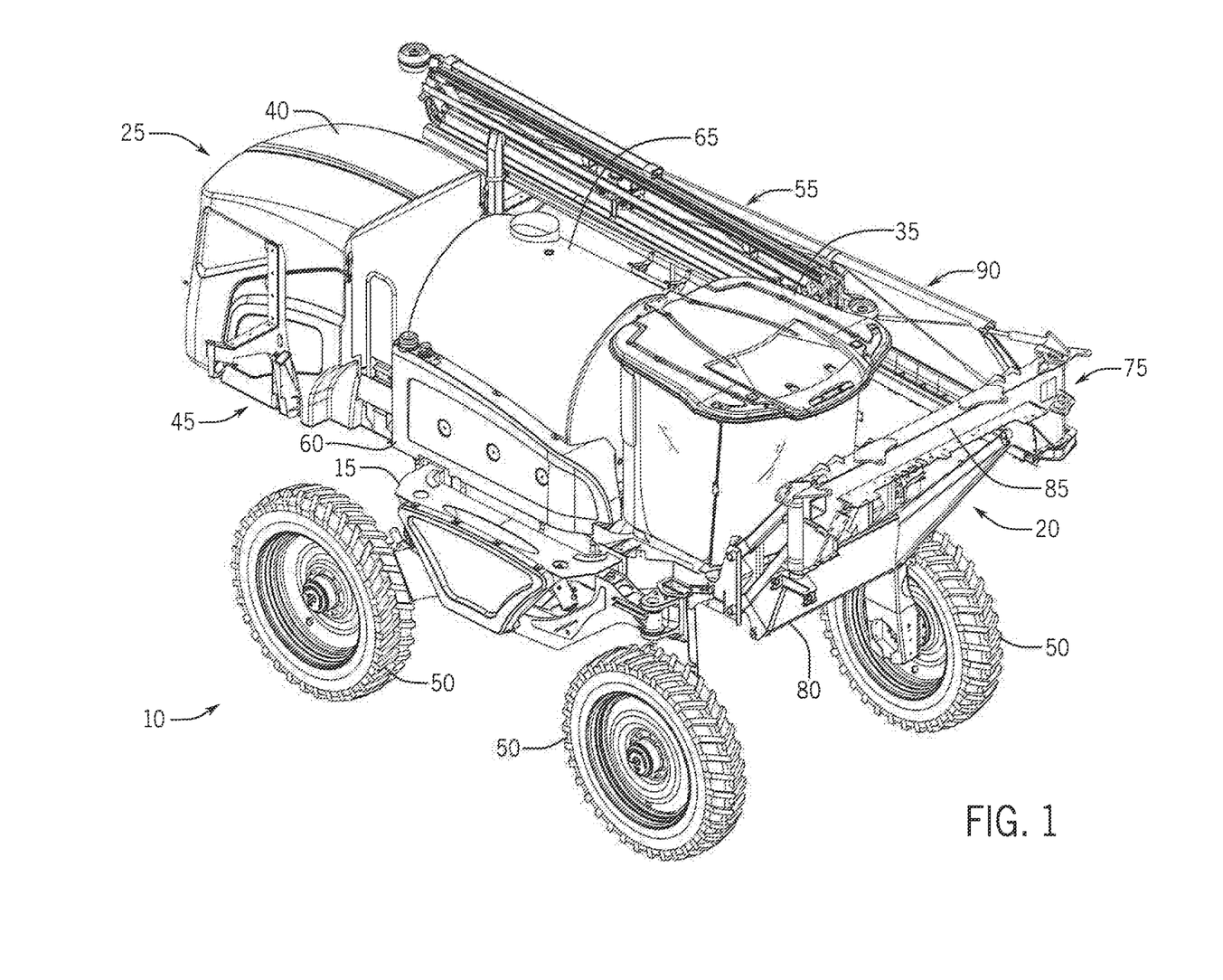
FIG. 1 is an isometric view of a front-boom sprayer from a first perspective, where the boom is in a raised position, and the left boom arm is in a retracted position.
Figure 2:
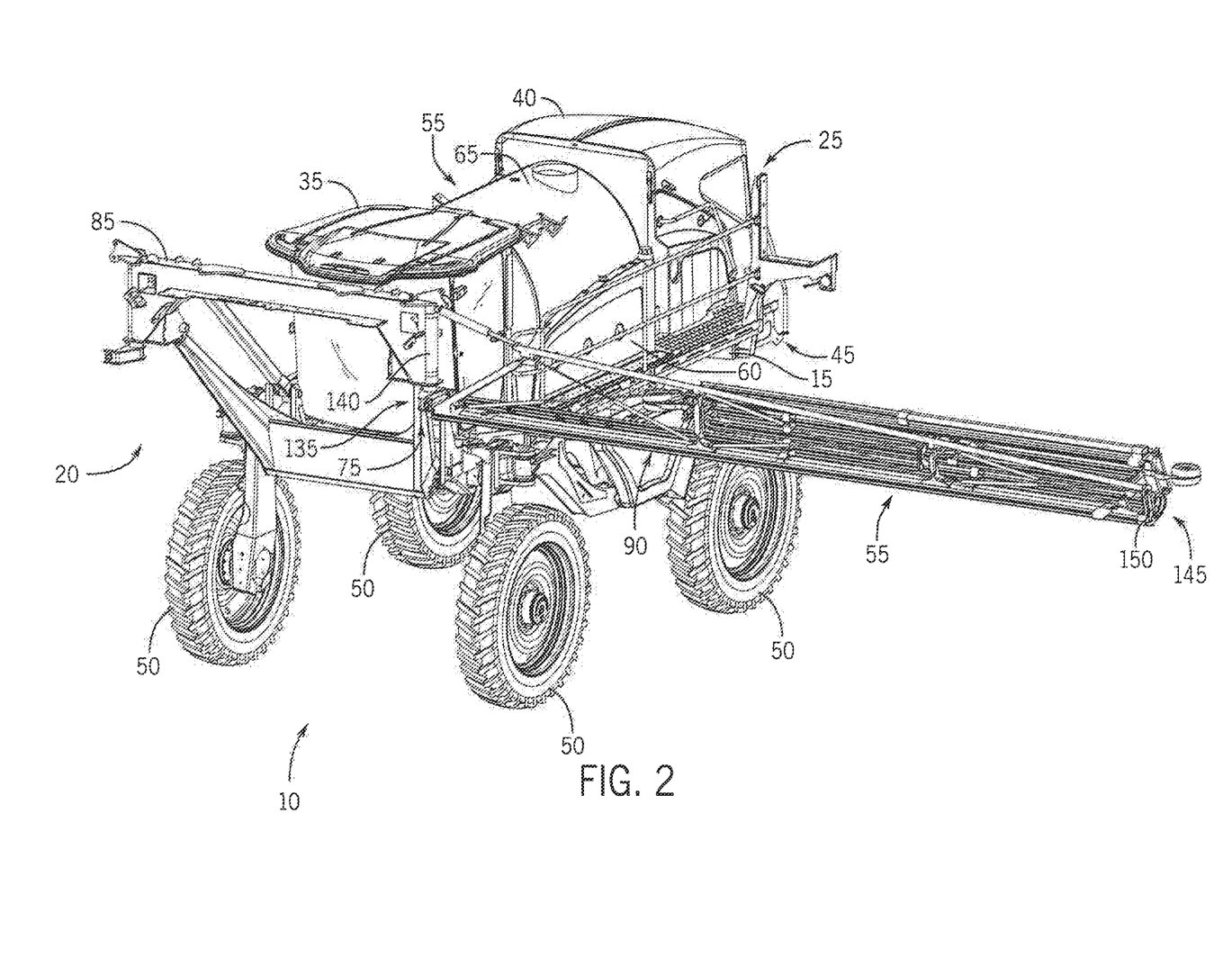
FIG. 2 is an isometric view from a second perspective of the front-boom sprayer of FIG. 1, where the boom is in a raised position, the right boom arm is removed, a first boom arm segment of the left boom arm is in an extended positioned, and second and third boom arm segments of the left boom arm are in the retracted position.

The boom 75 is connected to the chassis 15 with a lift arm arrangement or assembly 80. The lift arm assembly 80 is attached to a boom center section 85, The lift arm assembly 80 is configured to move the boom 75 up and down for adjusting the height of application of the product and/or to raise the boom 75 above objects (e.g., agricultural product). FIGS. 1 and 2 show the boom in a raised position, and FIGS. 3 and 4 show the boom in a lowered position.

Coupled to the boom center section 85, the boom 75 has multiple interconnected segments that collectively define each of a left and right boom arm, respectively. Left and right for the boom 75 are defined with respect to an operator's view of the boom 75 from the operator cab 35. Left and right boom arms extend in opposite directions from the boom center section 85. The left and right boom arms are mirror identical about a longitudinal axis of the sprayer 10, and thus, only left boom arm 90 is shown and described in further detail. For simplicity, FIGS. 1-4 show the right boom arm removed. FIG. 1 shows the left boom arm 90 in a retracted, or transport, position. FIGS. 2-4 show the left boom arm 90 in an extended position.

The left boom arm 90 has multiple segments, including first, second, and third boom arm segments 100, 105, and 110 (FIG. 4), respectively. The number of boom arm segments can vary among sprayer designs. Collectively, the boom center section 85, the left boom arm 90, and the right boom arm define the boom 75. The boom 75 has an inner facing or inward side 125 that faces toward the operator cab 35 and provides a vehicle mounting surface(s) with mounting structures configured for mounting the boom 75 to the lift arm assembly 80. Opposite the inner facing side 125 is an outer facing or outward side 130 of the boom 75 that faces away from the operator cab 35.

Figure 3:
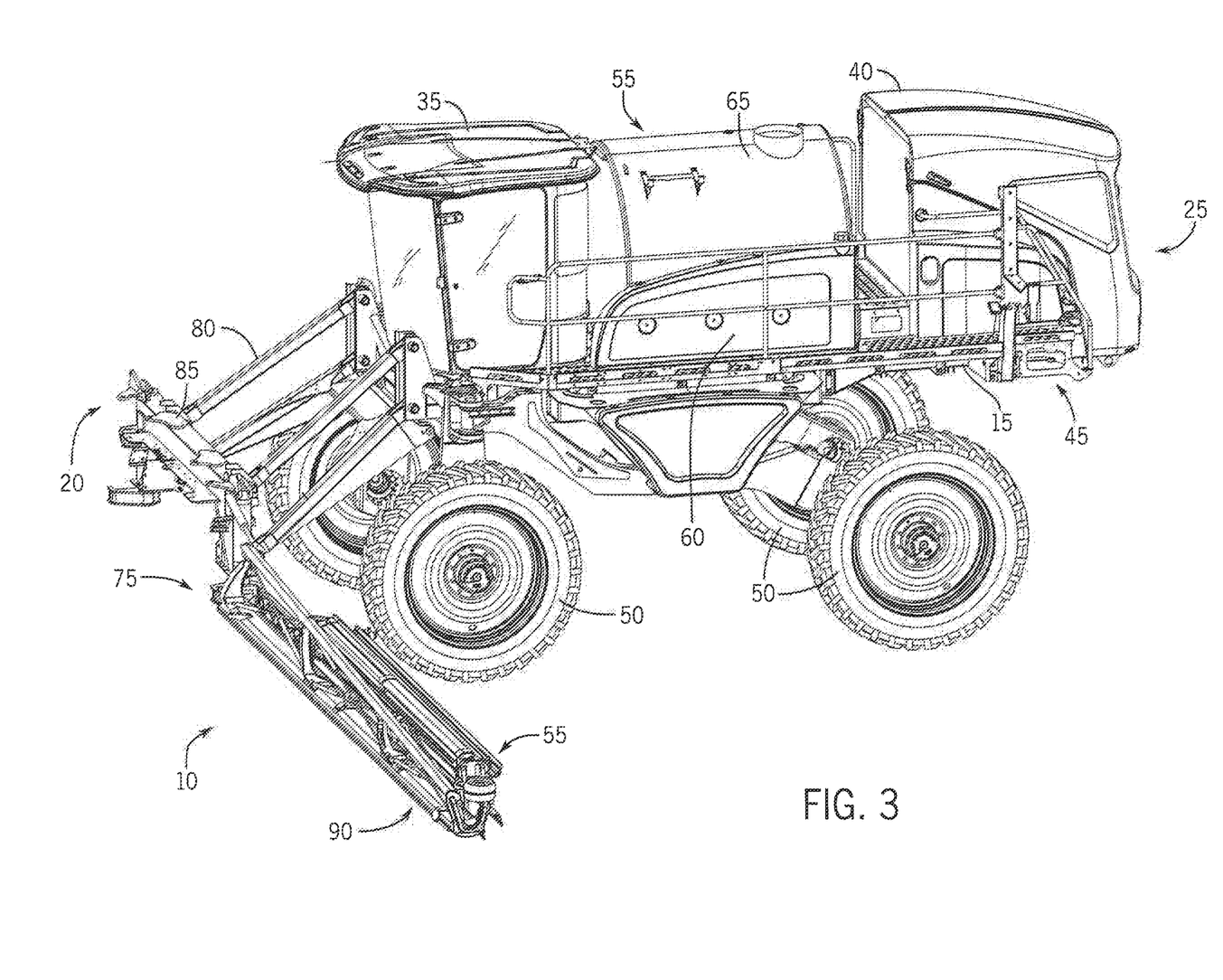
FIG. 3 is an isometric view from the second perspective of the front-boom sprayer of FIG. 1, where the boom is in a lowered position, the right boom arm is removed, the first boom arm segment of the left boom arm is in the extended positioned, and the second and third boom arm segments of the left boom arm are in the retracted position.
Figure 4:
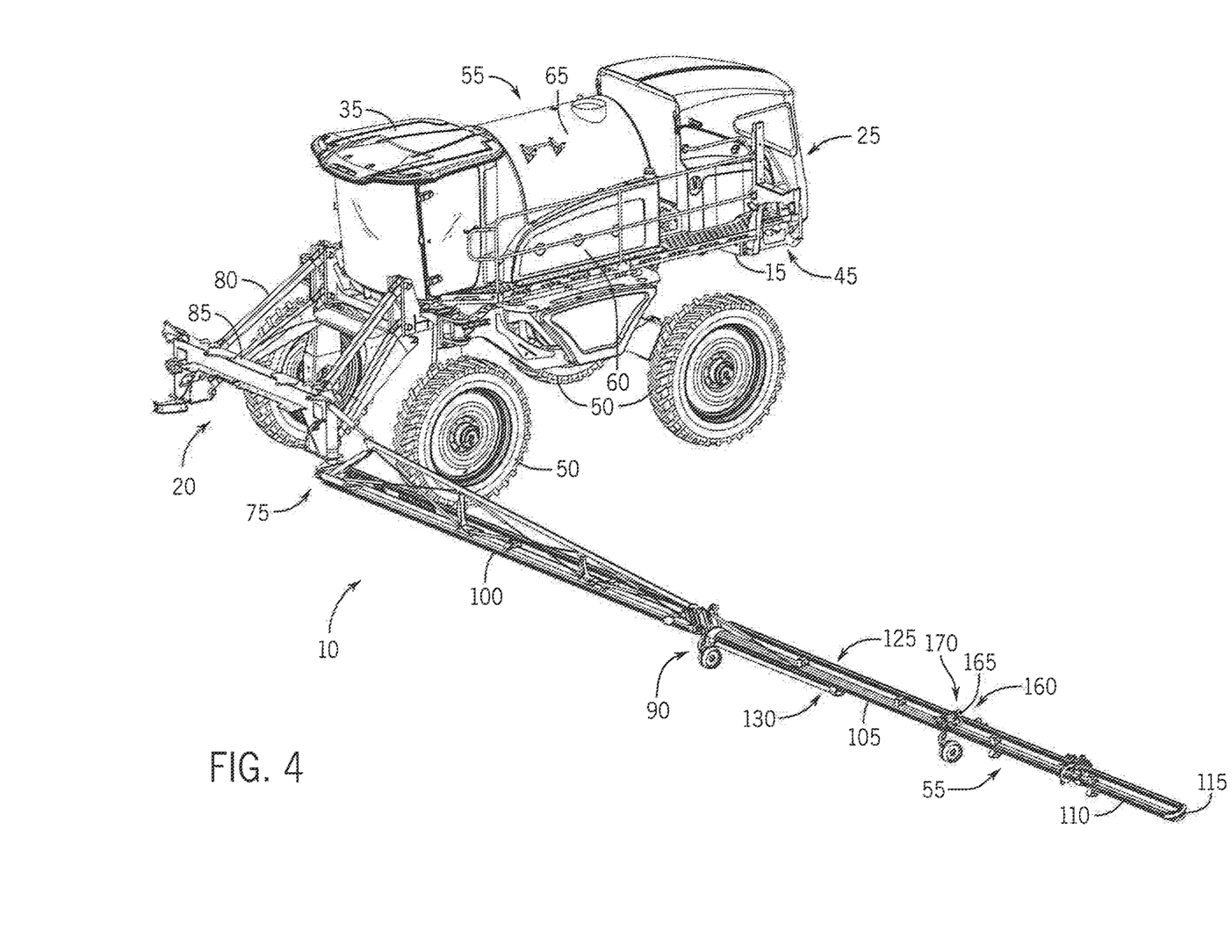
FIG. 4 is an isometric view from the second perspective of the front-boom sprayer of FIG. 1, where the boom is in the lowered position, the right boom arm is removed, and the left boom arm is in a fully extended position.

FIGS. 2 and 3 show the left boom arm 90 in a first extended, spray position, where only the first segment 100 of the left boom arm 90 is extended. Moreover, FIG. 2 shows the left boom arm 90 at a first spray height and FIG. 3 shows the left boom arm at a second spray height. FIG. 4 shows the left boom arm in a second extended, spray position, where all of the first, second, and third segments 100-110 are extended, The boom center segment and/or the first, second, and third boom arm segments 100-110 are configured with actuators to allow the left boom arm 90 to fold and extend as necessary for operation.

With reference to FIG. 2, the first boom arm segment 100 has an inner end 135 that is connected with hinge 140 to the boom center section 85. The hinge 140 is configured to allow for generally forward/rearward horizontal pivoting of the first boom arm segment 100, and consequently second and third boom arm segments 105 and 110, away/toward the chassis 15 when pivoting the first boom arm segment 100.

The second boom arm segment 105 has an inner end 145 that is connected with hinge 150 to the outer end 155 of the first boom arm segment 100. The hinge 150 is configured to allow for generally rotating the second boom arm segment 105, and consequently third boom arm segment 110, away/toward the first boom arm segment 100 when pivoting the second boom arm segment 105.

With reference to FIG. 4, the third boom arm segment 110 has an inner end 160 that is connected with hinge 165 to the outer end 170 of the second boom arm segment 100. The hinge 165 is configured to allow for generally rotating the third boom arm segment 110 away/toward the second boom arm segment 105 when pivoting the third boom arm segment 110.

The first boom arm segment 100 has a truss arrangement. Included with the truss arrangement is a longitudinal tube 175 (FIG. 6), which is one example of a tube in the truss arrangement, FIG. 4 shows the left boom arm having multiple longitudinal tubes. Aspects of the invention are discussed in connection with the longitudinal tube 175, but can be used in many other tube arrangements.

Figure 6:
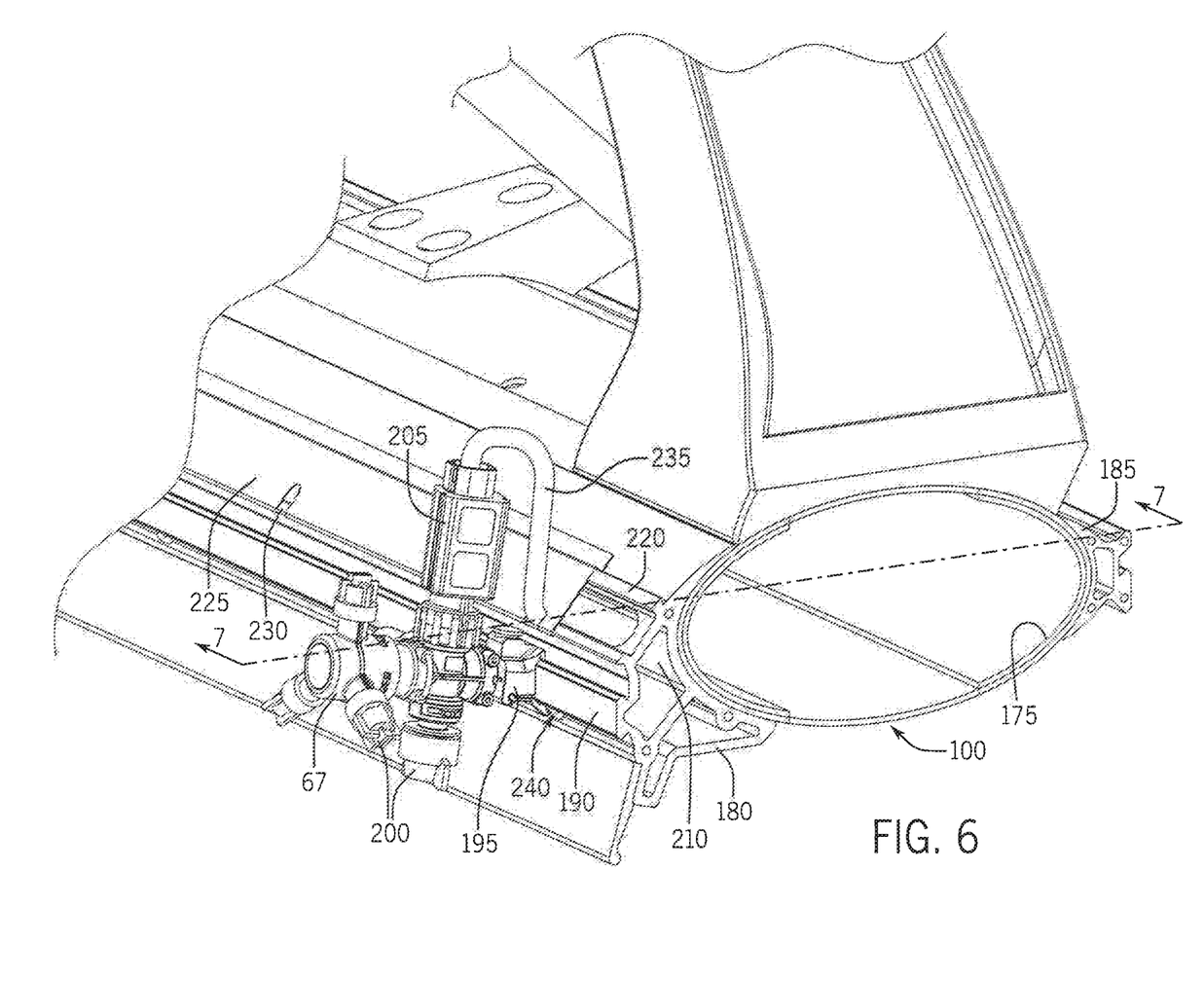
FIG. 6 is an enlarged isometric view of a portion of the left boom aim of FIG. 4 according to some aspects of the present invention.
Figure 7:
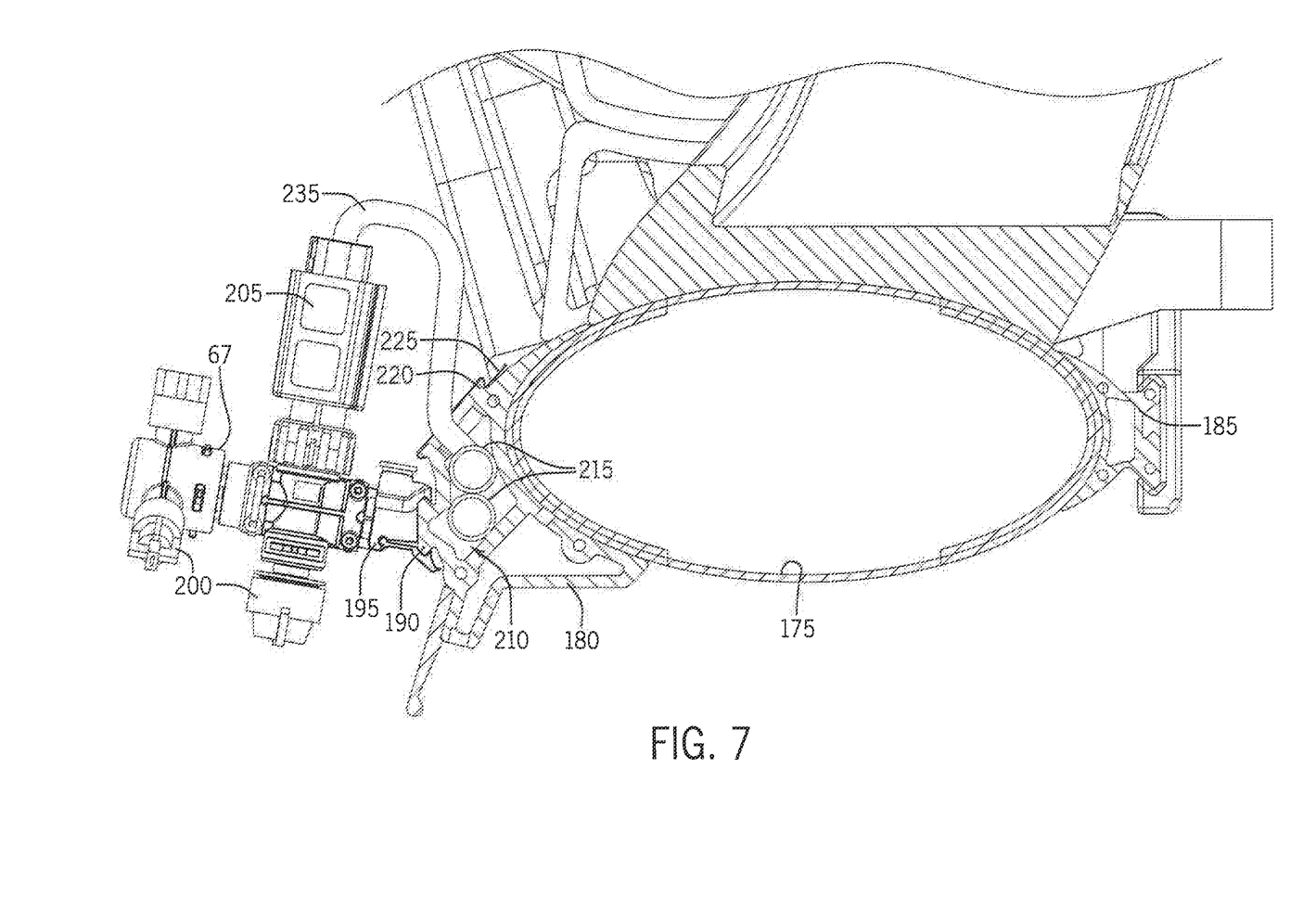
FIG. 7 is a cross sectional view of a portion of the left boom arm in FIG. 4.

FIG. 5 is an enlarged view of the left boom arm 90 coupled with the boom center section 85 via the hinge 140. FIG. 6 shows a portion of the first boom arm segment 100 with one nozzle body 67. FIG. 7 shows a sectional view of the first boom arm segment 100. The longitudinal tube 175 is coupled to first and second extrusions 180 and 185, respectively. As shown in the figures, the first extrusion 180 acts as a chase for pipes, tubes, and/or control lines. As application booms get larger, alternate structural materials to metal (e.g., steel) become more attractive, due to the altering relationships between costs, weight, and stress characteristics. Composite materials like carbon fiber (CF) can carry distributed loads well. The shown longitudinal tube 175 is a composite material such as CF. Also as shown, the longitudinal tube 175 has an elliptical or oblong cross section.

CF tubes are great for torsion and good in bending, but are vulnerable to buckling and can crush on impact. Another material, such as aluminum, coupled to the CF tube can help. Extruding is an affordable method of constructing aluminum parts. The first and second extrusions 180 and 185 could be made of formed steel, plastic, or extruded aluminum. The first and second extrusions 180 and 185 could also be integral to the structure or added on, The first and second extrusions 180 and 185 can comprise of a different material from the CF tube 175, For example, the first and second extrusions 180 and 185 can consist of extruded aluminum, but other materials are possible. The following benefits can occur by adding bonded aluminum strips.

Protect against damage from collisions or light impacts.
Reinforce CF tubes in areas of compressive loads (control buckling of thin walls).
Provide mounting points for attachments (reduce stress risers from unnecessary holes).
Shaped to control air flow (or not produce turbulence).

The shown first extrusion 180 includes a first rail 190 for clipping nozzles bodies 67 or other apparatus to the application boom 75. For the construction shown, the nozzle bodies 67 include clips 195 for attachment to the first extrusion 180, spray nozzles 200 for applying the agricultural product, and a controller 205 for controlling the nozzle bodies 67. The shown construction is a multi-sprayer nozzle with an electrical controller for controlling the nozzle body. However, the invention is not limited to the multi-sprayer nozzle shown. Other nozzle bodies are possible including a nozzle body having a single sprayer and/or hydraulically controlled sprayers with a hydraulic controller.

The first extrusion 180 or chase includes a channel 210 for routing control lines 215 (electrical or hydraulic) along the length of the first boom arm segment 100. The first extrusion 180 includes a second rail 220. The second rail 220 is used for attaching a cap 225 or cover having openings, such as slots 230 or apertures. The channel 210 and cap 225 retain control lines, keeping them safe. The cap 225 provides a cover for the channel 210 to help keep moisture and dirt out of the channel 210. The slots 230 provide openings for control lines branches 235 to exit from the channel 210 to the controllers 205. Being placed close to the nozzle bodies 65 and with ports, the control line branches 235 are short and don't need clamps or ties. Lying loose in the channel 210, the main lines 215 are also not confined by clamps and ties, reducing the risk of chaffing, and via the snap on cap 225 or cover, they can be lifted in and out individually for quick assembly and service.

While the detailed construction shown has the first and second extrusions 180 and 185 mounted to the longitudinal tube 175, it is envisioned that the chase can be integral to the boom structure. If the chase is integral to the boom structure, like part of an aluminum extrusion, cost of assembly including time can be reduced. With an adequate number of ports, most all conceivable nozzle configurations can be accounted for, factor or field. Further, the first extrusion 180, or the integral chase, can include channels for pipes delivering agricultural product and/or air lines in conjunction with the control lines. Also, the first extrusion 180 as shown includes a drainage aperture 240 for liquid to drain from the channel 210.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:

1. An agricultural vehicle omprising:
   a chassis;
   wheels supporting the chassis for moving the agricultural vehicle;
   an application boom coupled to the chassis and configured to deliver agricultural product to an agricultural field, the application boom having a boom center section and a boom arm, the boom center section being supported on the chassis, the boom arm including
      a longitudinal truss member including a first boom section and a second boom section, the first boom section being coupled to the chassis via the boom center section, the second boom section being pivotably coupled to the first boom section by a hinge, the second boom section being supported relative to the chassis by the first boom section,
      a longitudinal chase supported relative to the chassis by the longitudinal truss member, the longitudinal chase defining a channel and including a first mounting structure, the first mounting structure including a first rail, the first mounting structure being outside of the channel, and
      a cover for the channel, the cover at least partially enclosing the channel when mounted, the cover being removable from the channel while the longitudinal chase is supported relative to the chassis; and
   an application system including
      a product tank supported by the chassis and storing a volume of the agricultural product for delivery onto an agricultural field,
      a plurality of nozzle bodies, each nozzle body of the plurality of nozzle bodies includes a respective clamp coupling the nozzle body to the first rail,
      a piping system delivering the agricultural product to the plurality of nozzle bodies, and
      one or more control lines coupled to the plurality of nozzle bodies and for controlling the plurality of nozzle bodies, the one or more control lines supported by the channel.

2. The agricultural vehicle of claim 1, wherein the longitudinal truss member includes a composite tube, and wherein the boom arm further includes a longitudinal chase member having the longitudinal chase, wherein the longitudinal chase member is a non-composite member coupled to the composite tube.

3. The agricultural vehicle of claim 2, wherein the composite tube is a carbon fiber tube, and the non-composite member is an aluminum extrusion.

4. The agricultural vehicle of claim 1, wherein the longitudinal chase further includes a second mounting structure, and wherein the cover comprises a cap mountable to the second mounting structure, the cap at least partially enclosing the channel when mounted.

5. The agricultural vehicle of claim 4, wherein the cap incudes a plurality of ports and wherein the one or more control lines includes a plurality of branches exiting the plurality of ports.

6. The agricultural vehicle of claim 1, wherein the channel includes a wall and wherein the wall includes a drainage aperture.

7. The agricultural vehicle of claim 1, wherein the application boom further includes a second boom arm including
a second longitudinal truss member, and
a second longitudinal chase supported by the second longitudinal truss member, the second longitudinal chase defining a second channel and including a second cover for the second channel, and
wherein the application system further includes
a second plurality of nozzle bodies, and
a second one or more control lines coupled to the second plurality of nozzle bodies and for controlling the second plurality of nozzle bodies, the second one or more control lines supported by the second channel.

8. The agricultural vehicle of claim 1, wherein the longitudinal chase extends along a first length and the first mounting structure extends along a second length, with the second length being parallel to the first length, the plurality of nozzle bodies being spaced apart along the second length on the first mounting structure.

9. An agricultural vehicle comprising:
a chassis;
wheels supporting the chassis for moving the agricultural vehicle;
an application boom coupled to the chassis and configured to deliver agricultural product to an agricultural field, the application boom including,
a boom center section supported on the chassis;
a first boom arm and a second boom arm, each of the first boom arm and the second boom arm including, respectively,
a longitudinal composite tube including a first boom section and a second boom section, the first boom section being coupled to the chassis via the boom center section, the second boom section being pivotally coupled to the first boom section by a hinge, the second boom section being supported relative to the chassis by the first boom section,
a non-composite chase supported relative to the chassis by the longitudinal composite tube, the non-composite chase defining a channel and including a mounting structure outside of the channel, the mounting structure including a respective rail, and
a cover for the channel, the cover at least partially enclosing the channel when installed, the cover being removable from the channel while the non-composite chase is supported relative to the chassis; and
an application system including
a product tank supported by the chassis and storing a volume of the agricultural product for delivery onto an agricultural field,
a plurality of nozzle bodies, each nozzle body of the plurality of nozzle bodies includes a respective clamp coupling the nozzle body to one of the mounting structures and having a product dispensing nozzle,
a piping system delivering the agricultural product to the plurality of nozzle bodies, and
one or more control lines coupled to the plurality of nozzle bodies and for controlling the plurality of nozzle bodies, the one or more control lines supported by at least one of the channels.

10. The agricultural vehicle of claim 9, wherein each of the longitudinal composite tubes is a carbon fiber tube, and each of the non-composite chases is an aluminum extrusion.

11. The agricultural vehicle of claim 9, wherein each of the longitudinal composite tubes has an exterior surface that is an elliptical or oval shape.

12. The agricultural vehicle of claim 9, and further comprising a lift arm arrangement that connects the application boom to the chassis and is configured to raise and lower the application boom.

13. The agricultural vehicle of claim 9, wherein each of the non-composite chases further includes a second mounting structure, and wherein each of the first boom arm and the second boom arm further includes a cap mountable to a respective one of the second mounting structures, each of the caps at least partially enclosing a respective one of the channels when mounted.

14. The agricultural vehicle of claim 13, wherein the cap incudes a plurality of ports and wherein the one or more control lines include a plurality of branches exiting the plurality of ports.

15. The agricultural vehicle of claim 13, wherein each of the channels includes a wall and wherein the wall includes a drainage aperture.

16. An application boom for an agricultural vehicle for delivering agricultural product to an agricultural field, the application boom being supportable by a chassis of the agricultural vehicle, the application boom comprising:
a boom center section supported on the chassis;
a longitudinal composite tube including a first boom section and a second boom section, the first boom section being couplable to the chassis via the boom center section, the second boom section being pivotably coupled to the first boom section by a hinge, the second boom section being supportable relative to the chassis by the first boom section; and
a non-composite chase supportable relative to the chassis by the longitudinal composite tube, the non-composite chase
defining a channel for supporting one or more control lines,
including a first mounting structure outside of the channel, the first mounting structure supporting a plurality of nozzle bodies coupled to the one or more control lines,
including a second mounting structure, and
including a cap mounted to the second mounting structure, the cap including a plurality of ports for a plurality of branches of the one or more control lines to exit from the channel and couple to the plurality of nozzle bodies.

17. The agricultural vehicle of claim 16, wherein the first mounting structure includes a rail for receiving clamps of the plurality of nozzle bodies.

18. The agricultural vehicle of claim 16, wherein the longitudinal composite tube is a carbon fiber tube, and the non-composite chase is an aluminum extrusion.

* * * * *